March 20, 1945.    E. M. CROSLAND    2,371,877
CONVEYING APPARATUS
Filed Dec. 16, 1942    5 Sheets-Sheet 2
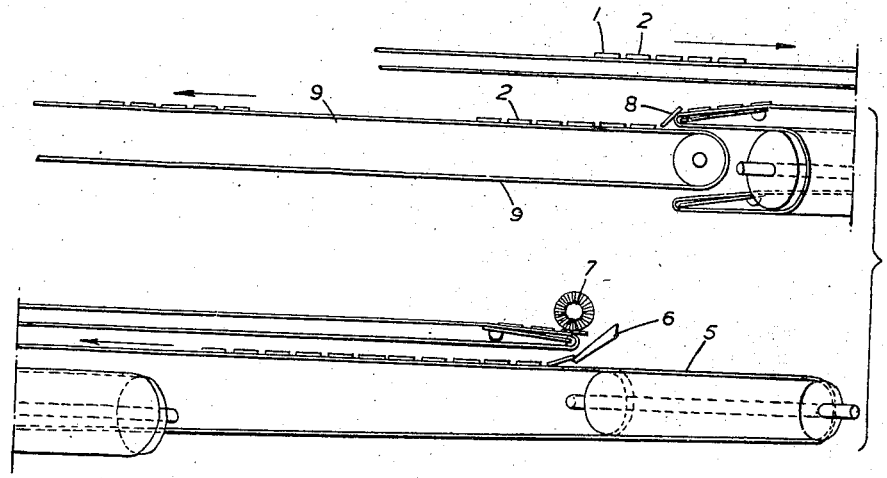
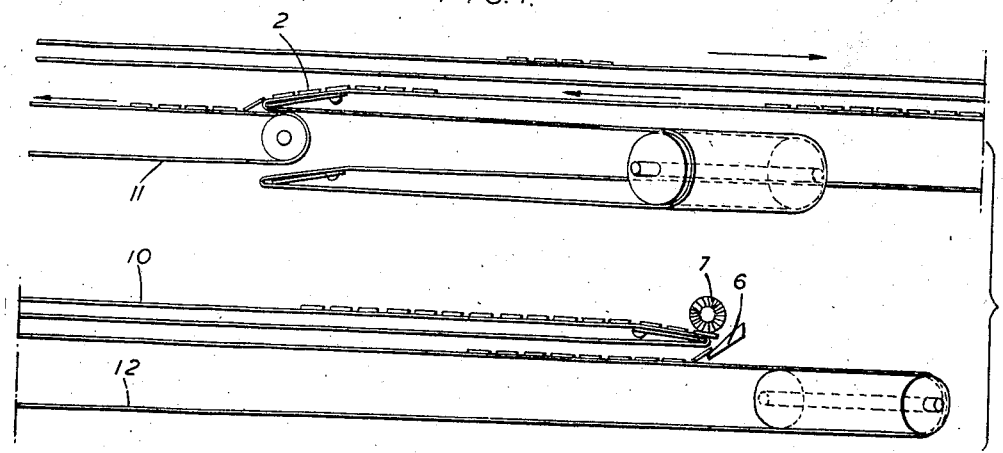

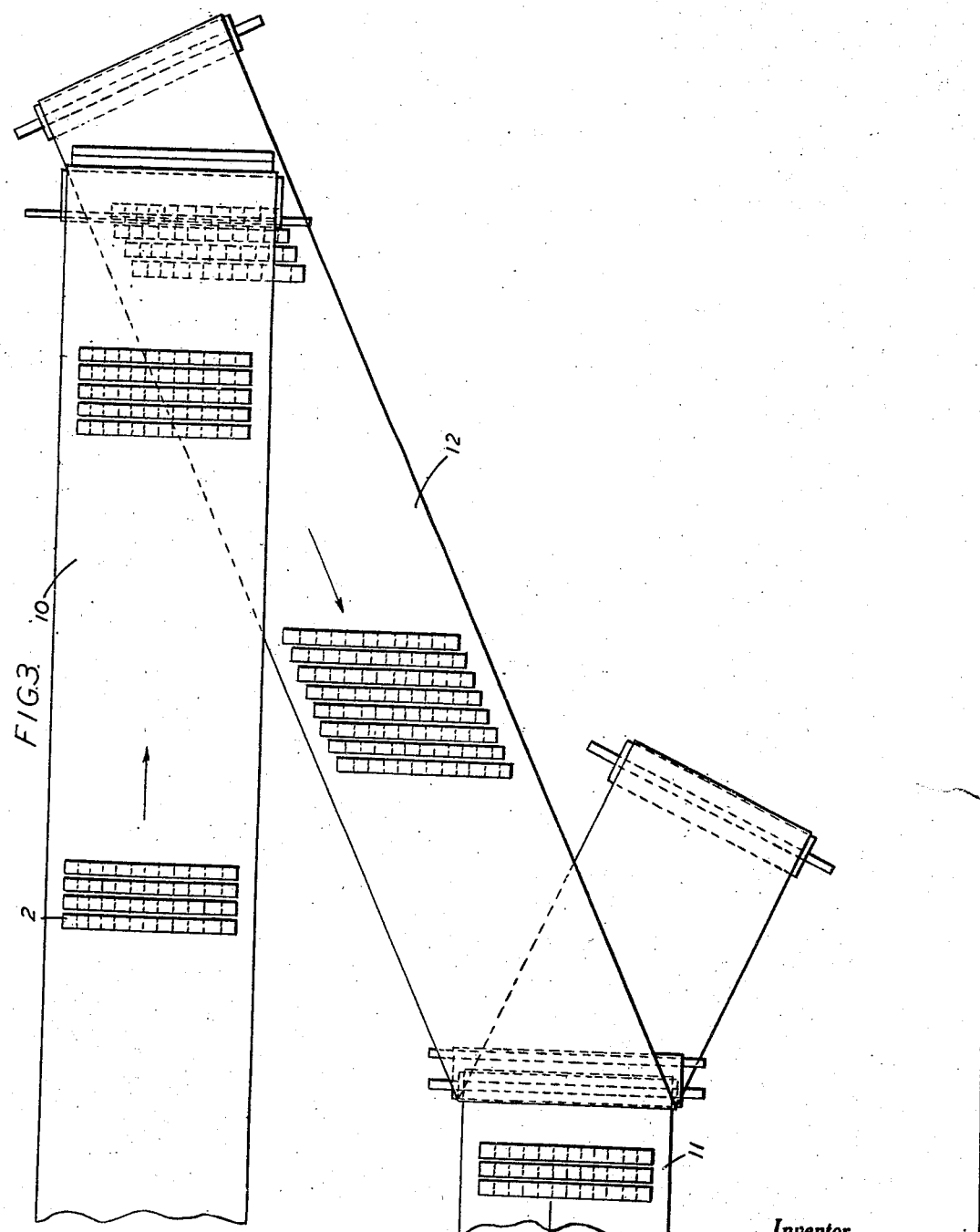

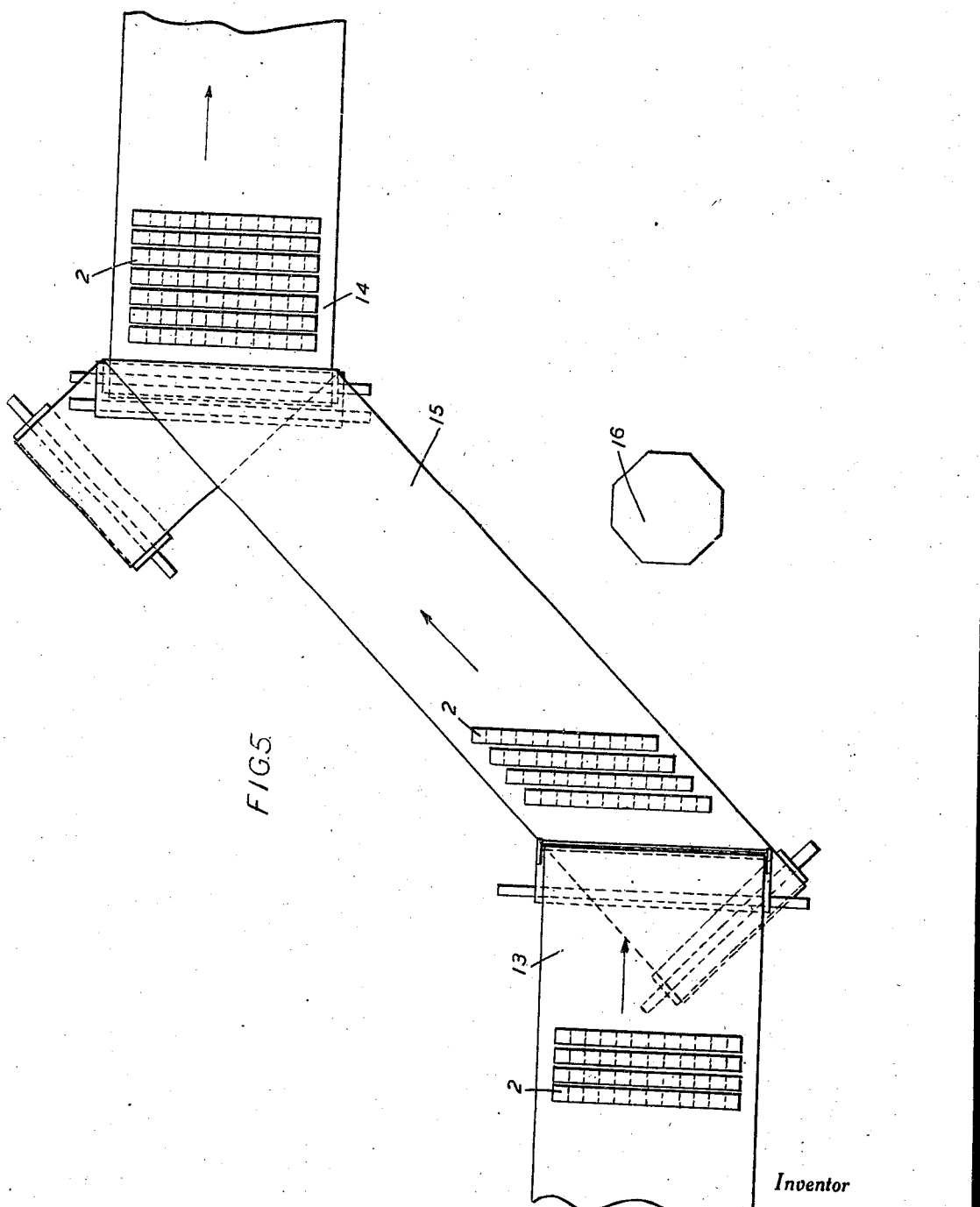

March 20, 1945.   E. M. CROSLAND   2,371,877
CONVEYING APPARATUS
Filed Dec. 16, 1942   5 Sheets-Sheet 5

Inventor
Edward M. Crosland,
By
Mason, Porter & Diller,
Attorneys.

Patented Mar. 20, 1945

2,371,877

UNITED STATES PATENT OFFICE 2,371,877

CONVEYING APPARATUS

Edward Milner Crosland, Earlestown, Newton-le-Willows, England, assignor to T. & T. Vicars Limited, Earlestown, Newton-le-Willows, England, a British company Application December 16, 1942, Serial No. 469,245
In Great Britain November 24, 1941

3 Claims. (Cl. 198—102)

The present invention relates to improvements in conveying apparatus more particularly suitable for the conveying of a plurality of flat articles such as biscuits.

An object of this invention is to enable biscuits or the like articles arranged in a predetermined disposition on a conveyor moving in one direction to be transferred, whilst maintaining this predetermined disposition to another conveyor travelling either in the same or in the opposite direction and parallel, or substantially parallel, to the said first conveyor.

For the purposes of cooling, inspection and packing, it is highly desirable that biscuits shall be baked in definite rows and equally spaced, and this spacing shall be maintained, but it is equally desirable, by reasons of exigencies of space, that the conveyor upon which cooling and inspection are performed does not run in one long continuous length but in a number of lengths, preferably parallel with one another. Or again, a clear longitudinal run from, for instance, a baking oven, may be interrupted by an obstacle, and the arrangement of this invention provides means whereby the biscuits can be conveyed around such obstacle and restored to a parallel path whilst maintaining their arrangement and disposition.

According to the present invention the articles such as biscuits are transferred from a conveyor belt, at a place where it is lapped back upon itself to a second conveyor, and from this second conveyor, at a place where it is lapped back upon itself, to a third conveyor, these three conveyors running in directions inclined to one another other than at right angles, the angle between the first and second conveyors being equal to, or substantially equal to, the angle between the second and third conveyors, so that the first and third conveyors may run parallel, or substantially parallel, to one another in similar or opposite directions.

The invention is more particularly described with reference to the accompanying drawings, in which:

Figure 2 is a corresponding side elevation,

Figure 3 is a plan view of another arrangement,

Figure 4 is a corresponding elevation,

Figure 5 is a plan view of another arrangement of conveyors,

Figure 1:
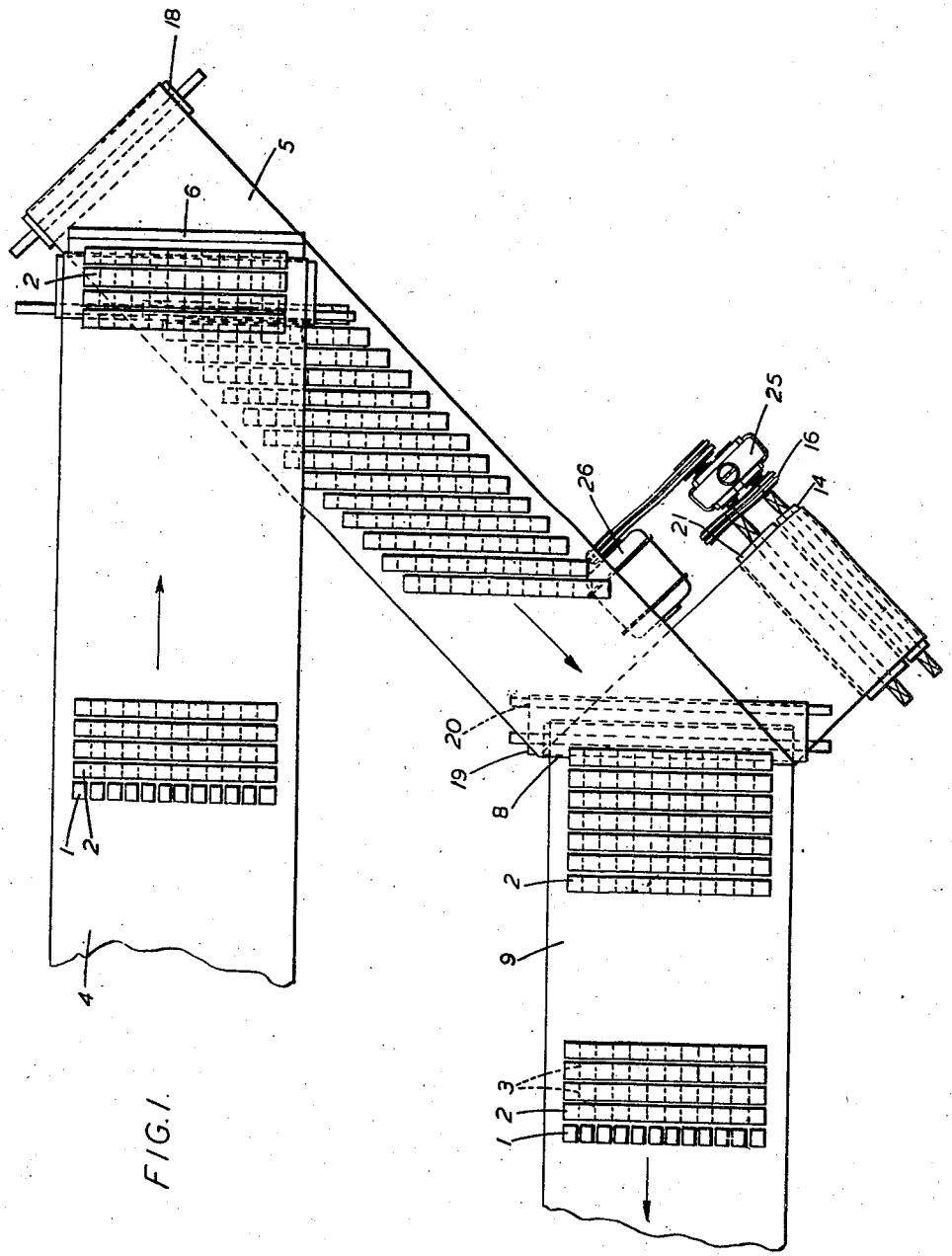
Figure 1 is a diagrammatic plan view of one arrangement of conveyor webs.

Articles such as biscuits are cut and baked and arranged separately from one another in lines across the oven conveyor, as shown at 1, or alternatively, as shown at 2, a group of biscuits may be cut as a line, the individual biscuits being divided by weakened places or score lines 3, so that at some subsequent time they can be broken off one from the other, for instance either before packing or even after packing prior to consumption, and these rows of biscuits are conveyed upon a conveyor 4. It will be appreciated that, particularly in the case of biscuits formed as a line, such as those shown at 2, it is desirable that they should be transferred without risk of the line of biscuits being broken up.

The biscuits are transferred from the conveyor 4 to a conveyor 5 disposed beneath it and running at an angle other than at right angle, so that the line of biscuits 2, which has been disposed at a right angle to the conveyor 4, will, when it comes upon the conveyor 5, lie at an angle to the line of run of this conveyor, the transfer being effected by the line of biscuits 2 being guided by a plate 6, so that this line is laid face uppermost but tail first on the conveyor 5. This action may be facilitated by a rotating brush 7 which supports the tail end of the line of biscuits until the leading edge of this line of biscuits contacts with the plate 6.

The biscuits are conveyed any desired distance by the conveyor 5 to the place where this conveyor is lapped back upon itself as at 8, and here either a similar plate to the plate 6 can be provided or the biscuits can be laid directly upon a third conveyor 9 which is travelling parallel, or substantially parallel, to the conveyor 4, and, in the arrangement shown in Figures 1 and 2, in a similar direction. Usually the second conveyor 5 between the conveyors 4 and 9 will be quite short.

It will be noticed that this arrangement provides that the biscuits are maintained in similar disposition and, if desired, in an unbroken line, as they are cut and baked, whilst space is saved by the juxtaposition of the conveyors 4 and 9.

As shown in Figures 3 and 4, the first and third conveyors 10, 11, run similarly parallel to one another as the conveyors 4 and 9 in the arrangement of Figures 1 and 2, but the transfer conveyor 12, corresponding to the conveyor 5, is disposed not at an angle of 45° but at a more acute angle such as 25°.

Figure 6:
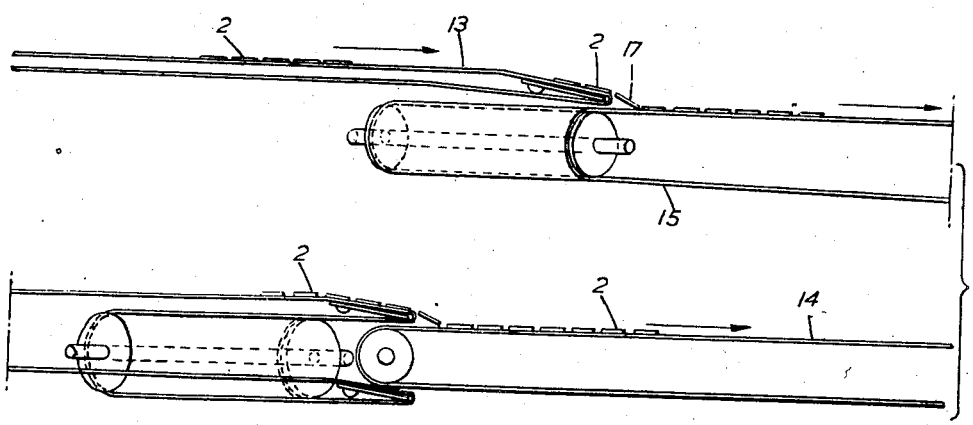
Figure 6 is a corresponding elevation.

Another arrangement is shown by way of example in Figures 5 and 6, where the lines of biscuits 2 are conveyed from a conveyor 13 to another conveyor 14 running parallel therewith or substantially parallel thereto, the biscuits being transferred from conveyor 13 to conveyor 14 by a transfer conveyor 15 disposed at an angle of 45° or less to the run of the conveyors 13 and 14, which may be particularly suitable where an obstacle such as a stanchion, indicated at 16, may be in the way of the direct run. In this case the biscuits are transferred directly from one conveyor to another, although a plate such as the plate 6 may be interposed, if desired. Instead of a plate, a bar such as 17 may be used or other convenient transfer arrangement as is well known.

Figure 7:
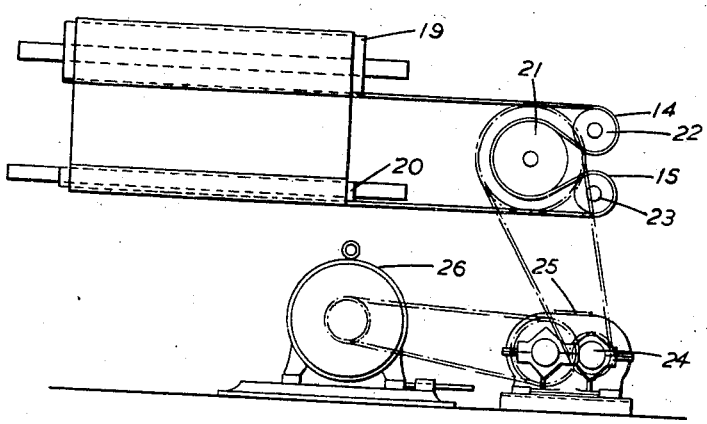
Figure 7 shows an end view of driving mechanism for the intermediate conveyor.

The intermediate conveyor 5, 12, or 15, as the case may be, may be lapped back upon itself over guide rollers such as 18, 19, 20 (Figures 1 and 7) and then over a roller 21 (Figure 7) and tightening rollers 22, 23 so that a good area of conveyor passes over the driving roller 21, which is driven from a pulley on a shaft 24, of a reduction gearing 25 driven by an electric motor 26 or the like prime mover.

The speed of travel of the intermediate conveyor 5, 12, or 15, as the case may be, is the secant of the angle it makes with the first conveyor 4, 10 or 13 respectively, times the speed of this first conveyor, in which case the strips or rows are spaced equivalently thereon, or greater than this, when the spacing will be greater than the spacing on the first conveyor. The speed of the third conveyor may be equal to that of the first conveyor to obtain equal spacing as on this conveyor or greater to obtain a larger spacing of the individual strips or rows. In the three arrangements of the conveyor belts illustrated in Figs. 1, 3, and 5 of the drawings, the intermediate conveyor belt is lapped back upon itself at an angle to the direction of travel of the strips and over fixed surfaces located adjacent the third conveyor belt. The fixed surfaces, as clearly illustrated in Figs. 2, 4, and 6, are arranged oblique to the direction of travel of the strips on the intermediate conveyor and transversely with respect to the third conveyor belt. The fixed surfaces maintain the intermediate conveyor belt in proper position with relation to the third conveyor belt.

Although the disposition of the conveyors is preferably such that the angle of the first and second is equal to that between the second and third conveyors, a slight inequality of angle still enables the advantages of this invention to be obtained and is within the scope of the invention herein claimed.

I declare that what I claim is:

1. A conveying apparatus comprising first and third conveyor belts arranged substantially parallel with each other and an intermediate conveyor belt, the first conveyor belt being arranged to receive unitary strips of biscuits lying in parallelism at right angles to the direction of travel of the first conveyor belt, said first conveyor belt being lapped back upon itself over the intermediate conveyor belt and the intermediate conveyor belt being lapped back upon itself at an angle to the direction of travel of the strips on the intermediate conveyor belt and over fixed surfaces located adjacent the third conveyor belt and arranged oblique to the intermediate conveyor belt and transversely with respect to the third conveyor belt, the three belts running in directions inclined to one another other than a right angle, the angle between the first and intermediate conveyor belts being substantially the angle between the intermediate conveyor belt and the third conveyor belt, whereby the unitary strips will be delivered by the first conveyor belt in an oblique position onto the intermediate conveyor belt corresponding to the angle formed by said conveyor belts, so that the intermediate conveyor belt will maintain the parallel relationship of the strips and will deliver the same onto the third conveyor belt in a position at right angles to the direction of travel of said conveyor belt.

2. A conveying apparatus comprising first and third conveyor belts arranged substantially parallel with each other and an intermediate conveyor belt, the first conveyor belt being arranged to receive unitary strips of biscuits lying in parallelism at right angles to the direction of travel of the first conveyor belt, said first conveyor belt being lapped back upon itself over the intermediate conveyor belt and the intermediate conveyor belt being lapped back upon itself at an angle to the direction of travel of the strips on the intermediate conveyor belt and over fixed surfaces located adjacent the third conveyor belt and arranged oblique to the intermediate conveyor belt and transversely with respect to the third conveyor belt, the three belts running in directions inclined to one another other than a right angle, the angle between the first and intermediate conveyor belts being substantially the angle between the intermediate conveyor belt and the third conveyor belt, whereby the unitary strips will be delivered by the first conveyor belt in an oblique position onto the intermediate conveyor belt corresponding to the angle formed by said conveyor belts, so that the intermediate conveyor belt will maintain the parallel relationship of the strips and will deliver the same onto the third conveyor belt in a position at right angles to the direction of travel of said conveyor belt, and means to drive said first and third conveyor belts in opposite directions.

3. A conveying apparatus comprising first and third conveyor belts arranged substantially parallel with each other and an intermediate conveyor belt, the first conveyor belt being arranged to receive unitary strips of biscuits lying in parallelism at right angles to the direction of travel of the first conveyor belt, said first conveyor belt being lapped back upon itself over the intermediate conveyor belt and the intermediate conveyor belt being lapped back upon itself at an angle to the direction of travel of the strips on the intermediate conveyor belt and over fixed surfaces located adjacent the third conveyor belt and arranged oblique to the intermediate conveyor belt and transversely with respect to the third conveyor belt, the three belts running in directions inclined to one another, the intermediate conveyor belt being arranged at an angle of forty-five degrees to the first conveyor belt and the third conveyor belt being arranged at an angle of forty-five degrees to the intermediate conveyor belt, whereby the unitary strips of biscuits will be delivered by the first conveyor belt in an oblique position onto the intermediate conveyor belt corresponding to the angle formed by said conveyor belts, so that the intermediate conveyor belt will maintain the parallel relationship of the strips and will deliver the same onto the third conveyor belt in a position at right angles to the direction of travel of said third conveyor belt, and means to drive the intermediate conveyor belt at a speed at least equal to the secant of the angle its run makes with the run of the first conveyor belt times the speed of the first conveyor belt.

EDWARD MILNER CROSLAND.